United States Patent [19]

Sasada

[11] Patent Number: 4,750,721
[45] Date of Patent: Jun. 14, 1988

[54] MOVABLE TABLE SYSTEM
[75] Inventor: Shigeru Sasada, Kusatsu, Japan
[73] Assignee: Dainippon Screen Mfg. Co., Ltd., Kyoto, Japan
[21] Appl. No.: 925,479
[22] Filed: Oct. 31, 1986
[30] Foreign Application Priority Data
Nov. 6, 1985 [JP] Japan .................................. 60-249545
[51] Int. Cl.⁴ ............................................. B23Q 1/04
[52] U.S. Cl. ...................................... 269/73; 318/687; 269/58
[58] Field of Search ....................... 269/71, 73, 55, 58, 269/289 R; 248/562; 318/135, 611, 687

[56] References Cited
U.S. PATENT DOCUMENTS 4,234,175 11/1980 Sato et al. ............................... 269/73
4,485,339 11/1984 Trost .................................... 318/687
4,525,659 6/1985 Imahashi et al. ..................... 318/611
4,667,139 5/1987 Hirai et al. ............................ 318/687

Primary Examiner—Frederick R. Schmidt
Assistant Examiner—Judy J. Hartman
Attorney, Agent, or Firm—Lowe, Price, Leblanc, Becker & Shur

[57] ABSTRACT

A movable table system comprises a base horizontally mounted on a foundation with an intermediate base engaged with the base through first guides so as to be movable reciprocatively in one linear direction. A movable table is engaged with the intermediate base through second guides similar to the first guides so as to be movable reciprocatively in the same linear direction. A direct-acting type drive is interposed between the movable table and the intermediate base for providing relative movement between the table and the intermediate base. Preferably, the base is mounted on the foundation through vibration absorbers.

10 Claims, 2 Drawing Sheets

MOVABLE TABLE SYSTEM

BACKGROUND OF THE INVENTION

1. Field of the Invention

The present invention generally relates to movable table systems, and particularly relates to movable table systems to be incorporated into various machines used for various purposes, for example, a ruling engine, and the like.

2. Description of the Prior Art

Generally, a conventional movable table system incorporated in a precision machine for precise processing or measurement so as to be used to convey an article, such as an object to be processed or measured, a cutting tool, a measuring instrument, or the like, to a predetermined position has such a basic structure as diagrammatically shown in FIG. 4. As seen in the drawing, a movable table having a mass of m is supported on guides 2 such that the guides 2 restrict the movement of the movable table 1 in the direction perpendicular to the surface of the paper of drawing while permitting the movable table 1 to reciprocate without friction in the direction parallel to the surface of the paper of drawing. The guides 2 are constituted, for example, by aerosliders and mounted on a base 3 which is in turn mounted on a foundation 4 through vibration absorbers 5 and 5'. A direct-acting type driving means, for example, a linear servomotor (not shown), is provided between the base 3 and the movable table 1 so as to move the movable table 1 left or right in the drawing relative to the base 3 when the linear servomotor is energized.

The thus arranged conventional movable table system has such problems in its operation as follows.

In the conventional movable table system of FIG. 4, when the movable table 1 is moved, for example, left in the drawing parallel to the surface of the paper of drawing, the center of gravity of the system as a whole moves left by an amount corresponding to the distance of movement of the movable table 1, so that the forces acting on the respective vibration absorbers 5 and 5' change. That is, in this case, the left vibration absorber 5 sinks a little while the right vibration absorber 5' comes up slightly, so that the system inclines as a whole.

Generally, it is necessary to reduce the spring constant of each of the vibration absorbers 5 and 5' in order to cause the vibration absorbers to cut off low-frequency vibrations. However, if the spring constant is reduced the responsiveness of the vibration absorbers 5 and 5' becomes poor and makes it impossible to follow the change in position of the center of gravity of the system.

With respect to almost all precision machines, inclination of a movable table incorporated in the precision machine has a great influence upon precision, and therefore vibration absorbers cannot be additionally provided to such a movable table system in which the center of gravity of the system varies as a whole.

Furthermore, in the conventional movable table system, when the linear servomotor is energized to thereby move the movable table 1, for example, left in the drawing at an acceleration $a_1$, reactive force $F = ma_1$ acts on the base 3 in the direction opposite to the movement of the movable table 1. The force F is then transmitted onto the foundation 4 through the vibration absorbers 5 and 5'. Although the acceleration $a_1$ can be increased to the order of exceeding 1 G which is the acceleration of gravity by the use of the linear servomotor, the force acting on the foundation 4 becomes greater in this case. Accordingly, there occurs such a problem that the vibrations cannot be suppressed unless both the strength and mass of the foundation 4 are made considerably large.

In other words and in more detail, in the case where the conventional movable table system is incorporated into a very high precision machine such as a ruling engine, it is necessary to make the base 3 sufficiently heavy as compared with the movable table 1 and to make the acceleration/deceleration of the movable table 1 sufficiently small, in order to suppress the vibrations of the movable table 1 in an accelerating/decelerating operation.

In addition, in the case where the movable table system is incorporated, for example, in a wire bonder used in a process of manufacturing integrated circuits, the movable table 1 is moved at a large acceleration/deceleration so that it may be a source of vibrations in itself to thereby make it difficult to effect high-precise positioning of the table per se.

SUMMARY OF THE INVENTION

It is therefore an object of the present invention to eliminate the above-discussed problems in the conventional movable table system.

It is another object of the invention to provide a movable table system in which the center of gravity of the system as a whole does not move in spite of the movement of the table and in which occurrence of vibrations can be suppressed in spite of a large acceleration/deceleration of the table when moved.

In order to attain the above objects, according to an aspect of the present invention, the movable table system comprises a base horizontally mounted on a foundation, an intermediate base engaged with the base through first guides so as to be reciprocatingly movable in one linear direction, a movable table engaged with the intermediate base through second guides similar to the first guides so as to be movable reciprocatingly in the same one linear direction, and a direct-acting type driving means interposed between the movable table and the intermediate base for providing relative movement between the table and the intermediate base.

Preferably, the first and second guides are constituted by aeroslide rails and aerosliders.

Preferably, the direct-acting type driving means may be a linear motor.

Preferably, the base is mounted on the foundation through vibration absorbers.

In the thus arranged movable table system according to the invention, the movable table can be rapidly moved relative to the intermediate base at a relative moving speed which is the sum of the respective moving speeds of the movable table and the intermediate base. At that time, the respective directions of movement of the movable table and the intermediate base relative to the base are opposite to each other, and the respective distances of movement of the two have a fixed relation therebetween, so that the center of gravity of the system as a whole does not move in spite of the movement of the movable table.

Furthermore, when the movable table is moved in one direction by thrust generated by the direct-acting type driving means, the intermediate base is simultaneously moved in the opposite direction as a reaction by the force received from the movable table. Accordingly, the thrust of the driving means acts on the movable table system as an internal force and is not applied to the outside, that is, to the foundation or like.

The above and other objects, features and advantages of the present invention will be more clear from the following detailed description with reference to the accompanying drawings.

DETAILED DESCRIPTION OF THE PREFERRED EMBODIMENTS

Figure 3:
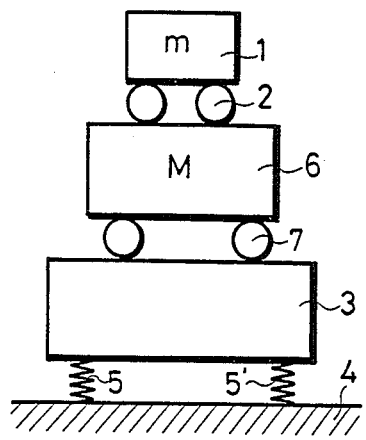
FIG. 3 is an explanatory diagram showing the basic structure of the movable table system according to the invention.

Before an embodiment of the movable table system according to the present invention is described in detail, the basic arrangement and operational principle thereof will be described with reference to FIG. 3 diagrammatically showing the basic structure thereof.

A movable table 1 having a mass of m is not mounted on a base 3 but is mounted on an intermediate base 6 having a mass of M through guides 2 constituted, for example, by aerosliders such that the guides 2 restrict the movement of the movable table 1 in the direction perpendicular to the surface of the paper of drawing while permitting the movable table 1 to reciprocate without friction in the direction parallel to the surface of the paper of drawing. The intermediate base 6 is mounted on the base 3 through guides 7 which are similar to the guides 2. The base 3 is in turn mounted on a foundation 4 through vibration absorbers 5 and 5'. A direct-acting type driving means, for example, a linear servomotor (not-shown), is provided between the movable table 1 and the intermediate base 6. No such a direct-drive type driving means is provided between the intermediate base 6 and the base 3. While the construction and operation of the linear servomotor per se are well known and therefore the description thereof is omitted, the operations of the intermediate base 6 and the base 3 driven by the linear seromotor will be described hereunder.

When the linear servomotor is now energized, the excitation coils thereof are successively excited to thereby produce magnetic force acting as thrust between the movable table 1 and the intermediate base 6. The thrust functions as an action on one hand and likewise functions as a reaction on the other hand. For example, when, the movable table 1 is moved left relative to the base 3, the intermediate base 6 is reversely moved right relative to the base 3 by a reaction. If the force applied on the movable table 1 from the linear sevomotor is represented by F, then the following equations (a) and (b) should hold.

$$m\alpha_1 = F \tag{a}$$

$$M\alpha_2 = F \tag{b}$$

where $\alpha_1$ represents acceleration of the movable table 1, and $\alpha_2$ represents an acceleration of the intermediate base 6. If the respective velocities of the movable table 1 and the intermediate base 6 after a lapse of time t from start of acceleration are represented by $V_1$ and $V_2$, then the following equations (c) and (d) should hold.

$$V_1 = \alpha_1 t \tag{c}$$

$$V_2 = \alpha_2 t \tag{d}$$

Accordingly, if the relative acceleration of the movable table 1 relative to the intermediate base 6 is represented by $\alpha$ and the relative velocity of the same is expressed by V, then the following equations (e) and (f) should hold.

$$\alpha = \alpha_1 + \alpha_2 \tag{e}$$

$$V = V_1 + V_2 \tag{f}$$

In general, an inequality $M \geq m$ is valid, where M represents the mass of the intermediate base 6 and m represents the mass of the movable table 1. Let M be replaced by K·m, that is, $M = K \cdot m$, then $K \geq 1$.

The equation (b) therefore becomes as follows.

$$\alpha_2 F/M = F/(K \cdot m) \tag{g}$$

From the equations (e), (a) and (g), the following equation (h) should hold.

$$\alpha = \frac{F}{m} + \frac{F}{K \cdot m} = \frac{F}{m}\left(1 + \frac{1}{K}\right) \tag{h}$$

From the equations (f), (c) and (d), the following equation should hold.

$$V = \alpha_1 t + \alpha_2 t + (\alpha_1 + \alpha_2)t.$$

Therefore, from the equations (e) and (h), the following equation (i) should hold.

$$V = \frac{F \cdot t}{m}\left(1 + \frac{1}{K}\right) \tag{i}$$

It is apparent from the equations (h) and (i) that the relative acceleration and the relative velocity V take maximal values $\alpha_{max}$ and $V_{max}$, respectively, when $K = 1$, or in other words when the mass m of the movable table 1 is equal to the mass M of the intermediate base 6.

These maximal values max and Vmax are expressed by the following equations:

$$\alpha_{max} = 2 \cdot (F/m) = 2\alpha_1$$

$$V_{max} = 2 \cdot (F \cdot t/m) = 2V_1.$$

Figure 4:
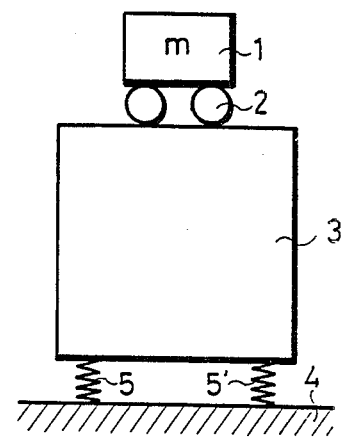
FIG. 4 is an explanatory diagram showing the basic structure of a conventional movable table system.

This means that ruling can be performed at a cutting speed doubled without change of the thrust F of the linear servomotor in the case where, for example, a diamond cutting tool is fixed on the movable table and a glass plate coated with a thin resist film is fixed to the intermediate base 6, compared with the case where the glass plate is fixed to the base 3 in the conventional system of FIG. 4.

In other words, this means that, if the cutting speed may be the same as that in the prior art, it is possible to use a linear servomotor having thrust F reduced to half so that the system is more advantageous in consumption of electricity, evolution of heat, cost, etc., compared with the conventional one.

The distance of movement $S_1$ of the movable table 1 moved left in the drawing relative to the base 3 is ½ ($V_1$t), and the distance of movement $S_2$ of the intermediate base 6 moved right in the drawing relative to the base 3 is ½ ($V_2$t). Those distances of movement $S_1$ and $S_2$ are no more than the distances of movement of the center of gravity of the movable table 1 and the intermediate base 6 respectively. Because the base 3 does not move actually and the equation $$mS_1 = MS_2 \qquad (j)$$

should always hold, the center of gravity of the movable table system as a whole does not move. In other words, the center of gravity of the system as a whole does not move regardless of the position of the movable table 1. Accordingly, the base 3 can be mounted on the foundation 4 through vibration absorbers 5 and 5' each having a sufficiently small spring constant to advantageously cut off low-frequency vibrations.

Furthermore, in this movable table system, when the movable table 1 is moved for example, left in the drawing at an acceleration $a_1$ by the thrust F of the linear servomotor for moving the movable table 1, the intermediate base 6 simultaneously receives reaction force $Ma_2 = F$ which provides an acceleration $a_2$ to the intermediate base 6 from the movable table 1 as a reaction. Accordingly, the thrust F of the linear servomotor functions as an internal force with respect to the system and has no influence upon the foundation 4. Accordingly, vibrations are not induced even if the foundation is a floor per se which has not so large strength and mass.

The basic arrangement and operational principle of the movable table system according to the invention have been described, and the present invention will be further described, by way of example, with reference to a case where an embodiment of the movable table system according to the present invention is incorporated in a ruling machine.

The ruling engine is a precision machine of the kind of the above-mentioned ruling engine, which is used for ruling lines with a thickness of the order of microns and a fine pitch (for example, 10 μm) on a glass plate coated with a thin resist film for the purpose of applying the ruling only to the thin resist film without injuring the glass plate, in the process of manufacturing original plates, such as metal mesh plates for television camera tubes, glass screen plates, or the like, In the ruling machine, a cutter including a diamond tool and a table having the glass plate fixed thereon are reciprocated, forward and backward, relative to each other. In a process of the forward movement the cutter is kept in contact with the surface of the glass plate to perform ruling, and in a process of the backward movement the cutter is returned in the state pulled up from the surface of the glass plate. Thus, the ruling of one line is completed in one reciprocation. During the process of the backward movement, the cutter having been pulled up is fed by a fine pitch (for example, 10 μm) in the direction perpendicular to the ruling direction to thereby be positioned for the next ruling. The embodiment of the movable table system according to the present invention is incorporated in the ruling machine for the purpose of performing the relative reciprocating motion of the cutter and the table.

Figure 1:
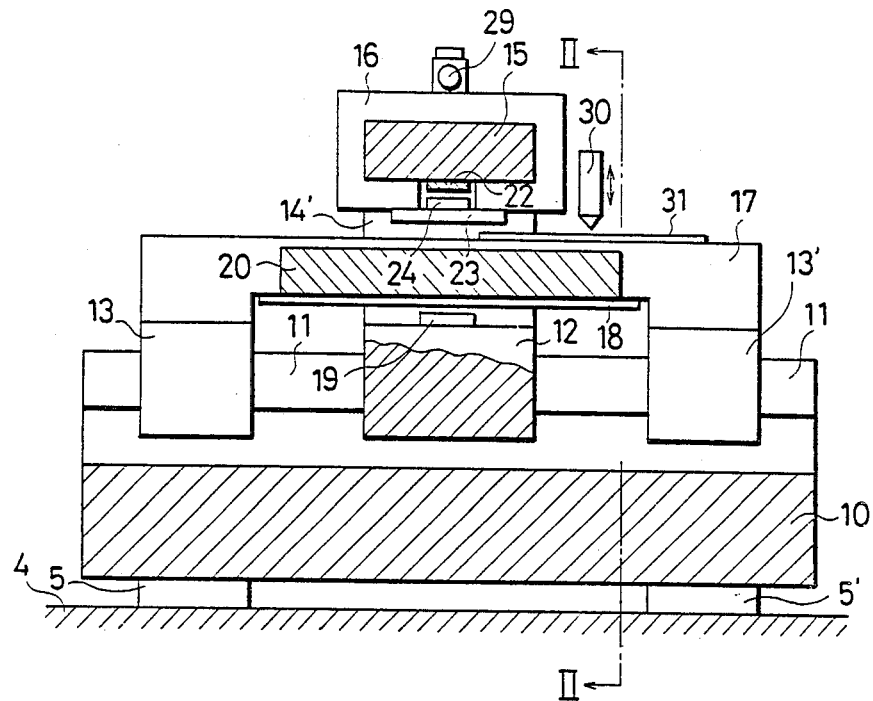
FIG. 1 is a front view in section on the line I—I and viewed in the direction of arrow in FIG. 2, showing important parts of a ruling machine incorporating a movable table system as an embodiment of the present invention.
Figure 2:
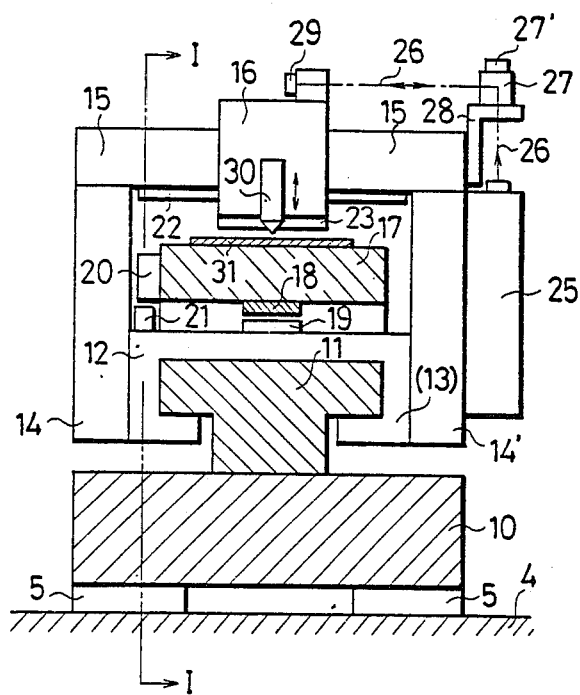
FIG. 2 is a side view in section on the line II—II and viewed in the direction of arrow in FIG. 1, showing important parts of the same ruling machine as FIG. 1.

FIG. 1 is a front view in section showing the arrangement of important parts of a ruling machine in which an embodiment of the movable table system of the invention is incorporated, and FIG. 2 is a side view in section of the same ruling machine. The view of FIG. 1 is a cross-section taken on the line I—I and viewed in the direction of arrow in FIG. 2, and the view of FIG. 2 is a cross-section taken on the line II—II and viewed in the direction of arrow in FIG. 1.

Referring to FIGS. 1 and 2, a base 10 is mounted on a foundation 4 through vibration absorbers 5 and 5'. The vibration absorbers 5 and 5' may be, for example, horizontal-level-automatic-control air cushion vibro-isolating beds or the like. A first aeroslide rail 11 is fixed on the upper surface of the base 10 along the longitudinal axis thereof. Aerosliders 12, 13 and 13' are engaged with the first aeroslide rail 11, and static-pressure pneumatic bearings are formed between the members 11 and 12; 11 and 13; and 11 and 13', respectively. In the condition that constant pressure of air is supplied to the pneumatic bearings at the same time, the aerosliders 12, 13 and 13' can smoothly slide left/right in FIG. 1 along the first aeroslide rail 11 without friction. Props 14 and 14' are vertically fixed to the opposite outer sides of the aeroslider 12, and a second aeroslide rail 15 is mounted on the upper ends of the props 14 and 14' and fixedly connected at its opposite ends with the props 14 and 14' respectively. An aeroslider 16 is engaged with the second aeroslide rail 15 so as to be slidable along the second aeroslide rail 15 in the condition that constant pressure of air is supplied to a static-pressure pneumatic bearing formed between the members 15 and 16, similarly to the case described above. A table 17 is mounted on the upper portions of the left and right aerosliders 13 and 13' in the drawing and fixedly connected at its opposite ends to the aerosliders 13 and 13' respectively. In other words, the left and right aerosliders 13 and 13' are connected to each other through the movable table 17. A linear coil 18 and a magnet 19 constituting a linear servomotor are fixed to the table 17 and the aeroslider 12 respectively, so that upon energization of the linear coil 18 thrust is produced between the linear coil 18 and the magnet 19.

A longitudinally extending linear scale 20 is fixed to the longitudinal side of the movable table 17, and a movable head 21 for the linear scale 20 is fixed to the aeroslider 12, so that the relative position of the table 17 relative to the aeroslider 12 can be measured by means of the linear scale 20 and the movable head 21.

A second linear servomotor is constituted by a linear coil 22 fixed to the second aeroslide rail 15 and a magnet 24 is fixed to the aeroslider 16 through a mount plate 23 which is in turn fixed to the lower surface of the aeroslider 16. Upon energization of the linear coil 22 thrust is produced between the linear coil 22 and the magnet 24.

A laser head 25 is fixed to an outer side of the prop 14', and an interferometer 27 is fixed on one end surface of the second aeroslide rail 15 through a bracket 28 with its optical axis made coincided with that of a light path 26 of laser light emitted from the laser head 25. A movable reflecting mirror 29 is fixed to an upper portion of the aeroslider 17 with its optical axis made coincided with that of the light path 26 of laser light transmitted from the interferometer 27. The interferometer 27 is provided with a reflecting mirror 27'. The change of the distance between the interferometer 27 and the movable reflecting mirror 29 moving together with the aeroslider 16 along the aeroslide rail 15 can be measured with resolving power of 0.01 $\mu$m by utilizing the interference between the light reflected from the reflecting mirror 29 and the light reflected from the reflecting mirror 27' to thereby detect the position of the aeroslider 16 moving along the second aeroslide rail 15. A cutter, for example, a diamond tool 30 is attached to a side portion of the aeroslider 16 through a cutter lifting means (not shown) having excellent reproducibility. A plate material to be subject to ruling, for example, a glass plate 31 coated with a thin resist film, is fixed on the upper surface of the table 17 at a predetermined position.

The ruling machine is provided with devices or means (not shown) as follows.

When being supplied with constant pressure of air as described above, the aerosliders 12, 13, 13' and 16 are put in a state that the aerosliders are slidable on the aeroslide rails 11 and 15 without friction. Accordingly, if the aeroslide rails 11 and 15 are dislocated a little in horizontal level, the aerosliders 12, 13, 13' and 16 are moved downward by their own weight or the weight of other members applied thereto. Therefore, in order to suppress such a motion, means for applying slight friction to each aeroslider are provided.

Furthermore, there are further provided means for restricting the stop position and stroke of the respective aeroslider, and drive means for returning the table 17 to its initial position when the power supply is turned on.

Description will be made as to the correspondency between the constituent components of the thus arranged embodiment of the movable table incorporated in the ruling machine as shown in FIGS. 1 and 2 and those in the basic structure of the present invention as shown in FIG. 1. The constituent component constituted by the aeroslider 12, the props 14 and 14', the second aeroslide rail 15, and the aeroslider 16 having the diamond tool 30 and kept at a predetermined stoppage position on the second aeroslide rail 15, is equivalent to the movable table 1 of mass m; the constituent component constituted by the aerosliders 13 and 13' and the table 17 is equivalent to the intermediate base 6 of mass M; and the constituent component constituted by the base 10 and the first aeroslide rail 11 is equivalent to the base 3.

The linear servomotor constituted by the magnet 19 and the linear coil 18 provided between the aeroslider 12 and the table 17 is equivalent to the direct-acting type driving means (not shown) provided between the movable table 1 and the intermediate base 6 in FIG. 3.

It has been described that a merit can be obtained when the mass m of the movable table 1 is made equal to the mass M of the intermediate base 6, and accordingly, it is to be understood that the same merit can be obtained when the weight of the constituent component equivalent to the movable table 1 is made equal to the weight of the constituent component equivalent to the intermediate base 6.

Description will be made hereunder as to the operation of the ruling machine as illustrated.

The aeroslider 12 is approached to the aeroslider 13' by the drive means for returning the table 17 to its initial position so as to stop the table 17 at its initial position. The diamond tool 30 is pulled down by the lifting means so as to be in contact with the glass plate 31. The linear coil 18 is energized to operate the linear servomotor constituted by the linear coil 18 and the magnet 19 to cause the aeroslider 12 to separate from the aeroslider 13' and to move toward the aeroslider 13. Such a driving condition has been described at the beginning of the description of the embodiment. Accordingly, compared with the case where the aerosliders 13 and 13' are fixed to the first aeroslide rail 11, the relative speed of the aeroslider 16 relative to the table 17 can be doubled, that is, the relative speed of the diamond tool 30 relative to the glass plate 31 can be doubled even if the linear servomotor has the same thrust. That is, a line can be ruled in the thin film of the glass plate 31 at a doubled speed. Next, the diamond tool 30 is pulled up from the surface of the glass plate 31 by the lifting means and then the aeroslider 12 and the table 17 are returned to their initial positions respectively. At the same time the linear coil 22 is energized and the linear motor constituted by the linear coil 22 and the magnet 24 is feedback-controlled by a signal generated from a detector (not shown) of the interferometer 27, so that the aeroslider 16 is moved along the second aeroslide rail 15 by a predetermined pitch (for example, 10 $\mu$m). Thus the diamond tool 30 is positioned for the next ruling.

Such a ruling procedure is repeated by a predetermined number of times.

During the ruling procedure, the center of gravity of the movable table system as a whole does not move even in the case where the ruling operation is performed at a high speed. Accordingly, the vibration absorbers 5 and 5' each having a small spring constant fulfil the function effectively enough to maintain the system horizontal as a whole. On the other hand, the center of gravity moves in the strict sense in the case where a ruling pitch calculating operation is made. However, because the movement, of the center of gravity is within a very small range (for example, 10 $\mu$m) and because the movement is made at a low speed, the movement can be easily followed up by a horizontal level automatic control mechanism (not shown) of the vibration absorbers 5 and 5'.

Although the embodiment has been illustrated as to the case where aeroslide means constituted by aeroslide rails and aerosliders are used as the guides 2 and 7 of FIG. 3, the invention is applicable to the case where the aeroslide guides are replaced by ball guides, slide guides, or the like. In short, the effect of the invention increases with decreasing friction. In addition, the linear servomotor constituted by the linear coil 18 and the magnet 19 used as the direct-acting type driving means may be replaced by air cylinders.

The movable table system according to the invention has such effects as follows.

(i) Because the center of gravity of the system as a whole does not move regardless of the position of a movable table or a like member, the movable table or the like member can be mounted on a foundation through vibration absorbers having a small spring constant to advantageously cut off low-frequency vibrations.

(ii) Because the thrust of direct-acting type drive means for operating a movable table or a like member acts as internal force with respect to the whole system or in other words because the thrust does not act on a foundation, a high-speed operation can be made without inducing vibrations.

(iii) A movable table or a like member can be moved by direct-acting type drive means at a maximum acceleration doubled compared with the conventional table system having direct-acting type drive means with the same capacity.

This means that, if the acceleration may be set to the same value as in the prior art, direct-acting type drive means having its thrust reduced to half can be used to thereby provide an advantage in saving energy and saving cost.

What is claimed is:

1. A movable table system, comprising a base horizontally mounted on a foundation; an intermediate base means including at least one intermediate base; first guide means for mounting said intermediate base means to said base such that said intermediate base means is reciprocatingly movable in one linear direction; a movable table; second guide means for mounting said movable table to the intermediate base means such that said intermediate base is movable reciprocatingly in said one linear direction, and means to maintain an invariable center of gravity in the system, including a direct-drive type driving means interposed only between said movable table and said intermediate base without direct driving means between the intermediate base means and the base for providing relative movement between said table and said intermediate base, whereby movement of said table along a path in said one linear direction initiated by said driving means results in compensating movement of said intermediate base, said compensating movement being substantially equal in distance and opposite in direction relative to said base.

2. A movable table system according to claim 1, wherein each of said first and second guide means are each constituted by aeroslide rail means and aeroslider means.

3. A movable table system according to claim 1, wherein said direct-acting type driving means include linear motor means.

4. A movable table system according to claim 2, wherein said direct-acting type driving means include linear motor means.

5. A movable table system according to claim 1, wherein said base is mounted on said foundation through vibration absorber means.

6. A movable table system according to claim 2, wherein said base is mounted on said foundation through vibration absorber means.

7. A movable table system according to claim 3, wherein said base is mounted on said foundation through vibration absorber means.

8. A movable table system according to claim 4, wherein said base is mounted on said foundation through vibration absorber means.

9. The movable table system of claim 1, wherein the mass of the movable table is substantially equal to the mass of said intermediate base means.

10. The movable table system of claim 1, wherein movement of said intermediate base means occurs automatically in response to movement of said table so that any inertial forces generated by movement of the table are substantially immediately compensated for by a corresponding oppositely directed movement of the intermediate base means.

* * * * *